United States Patent
Markham

[19]

[11] Patent Number: 5,904,118
[45] Date of Patent: May 18, 1999

[54] ANIMAL TOY WITH FLOATATION DEVICE

[75] Inventor: Joseph P. Markham, Arvada, Colo.

[73] Assignee: Bounce, Inc., Golden, Colo.

[21] Appl. No.: 08/871,236

[22] Filed: Jun. 9, 1997

[51] Int. Cl.⁶ .................................................. A01K 29/00
[52] U.S. Cl. ............................................................ 119/707
[58] Field of Search .................................... 119/702, 707, 119/708, 709, 710, 711, 174; 472/67; 446/153, 154, 155; 114/220; 43/2, 3; 441/88

[56] References Cited

U.S. PATENT DOCUMENTS

| | | | |
|---|---|---|---|
| 1,585,757 | 5/1926 | Borkenstein | 446/155 |
| 2,495,721 | 1/1950 | Heymann | 43/3 |
| 3,176,982 | 4/1965 | O'Daniell | 446/153 |
| 3,460,286 | 8/1969 | Danberg | 446/153 |
| 3,604,033 | 9/1971 | Lino | 441/8 |
| 3,830,202 | 8/1974 | Garrison | 119/709 |
| 4,063,526 | 12/1977 | Ueda | 114/220 |
| 4,133,296 | 1/1979 | Smith | 119/709 |
| 4,136,632 | 1/1979 | Day et al. | 114/220 |
| 4,203,857 | 5/1980 | Dugan | 15/104.93 |
| 4,557,219 | 12/1985 | Edwards | 119/710 |
| 4,613,311 | 9/1986 | Wood | 441/8 |
| 4,810,444 | 3/1989 | Markham et al. | 119/710 |
| 5,136,800 | 8/1992 | Lanius | 43/3 |
| 5,595,142 | 1/1997 | Chill | 119/710 |
| 5,619,954 | 4/1997 | Rotondi | 119/709 |
| 5,813,366 | 9/1998 | Mauldin, Jr. | 119/707 |

*Primary Examiner*—Michael J. Carone
*Assistant Examiner*—Elizabeth Shaw
*Attorney, Agent, or Firm*—Fields & Johnson, P.C.

[57] ABSTRACT

A floatable pet toy including a hollow deformable body with a buoyant material, such as a closed cell foam, inside of the body. The buoyant material increases the pet toy's buoyancy and resistance to deformation for durability. A rope may be attached to the body. In a second embodiment, the body may be elongated, made from elastomeric material, and substantially filled with a closed cell foam insert. This insert has a rope running longitudinally through its center and through an opening in a second end of the body. In a further embodiment, the body may be made from a flexible material, such as canvas or plastic. In a still further embodiment, the buoyant material may be injected into a sealed hollow deformable body for increased buoyancy and durability.

20 Claims, 3 Drawing Sheets

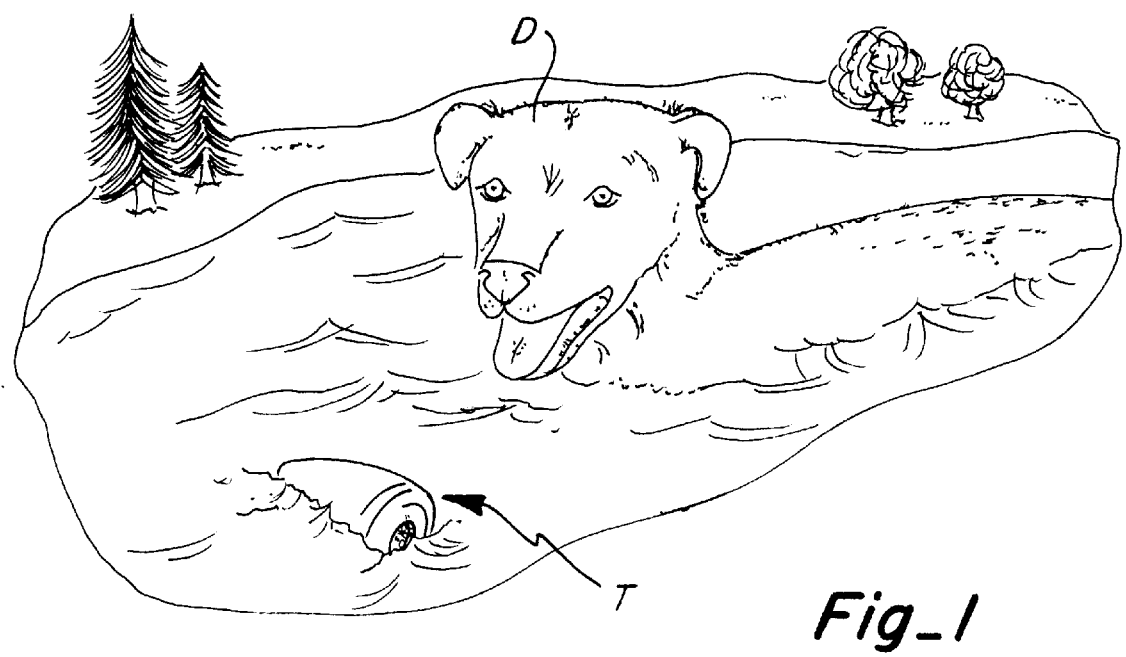
Fig_1
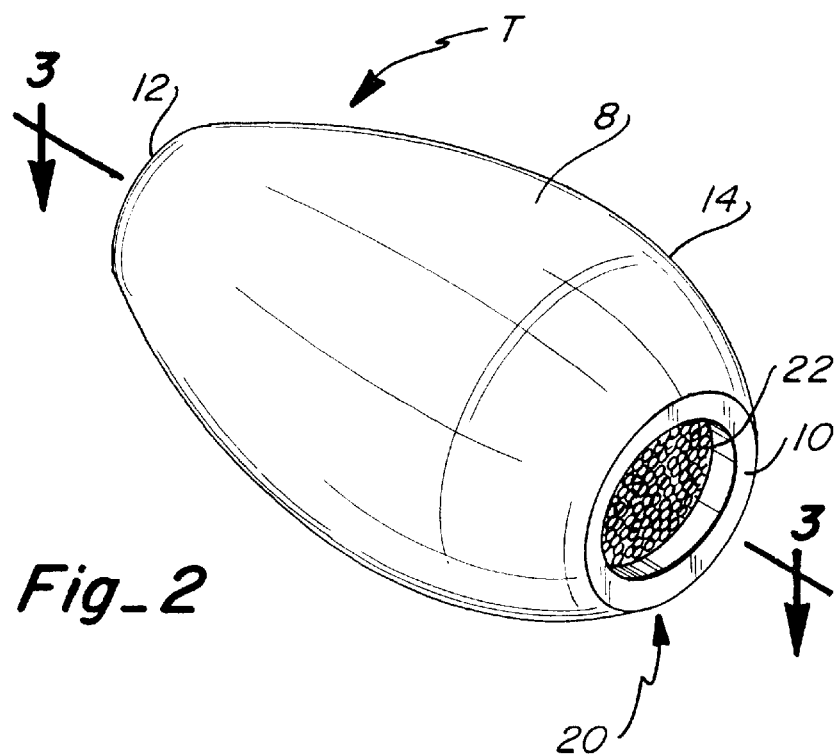
Fig_2

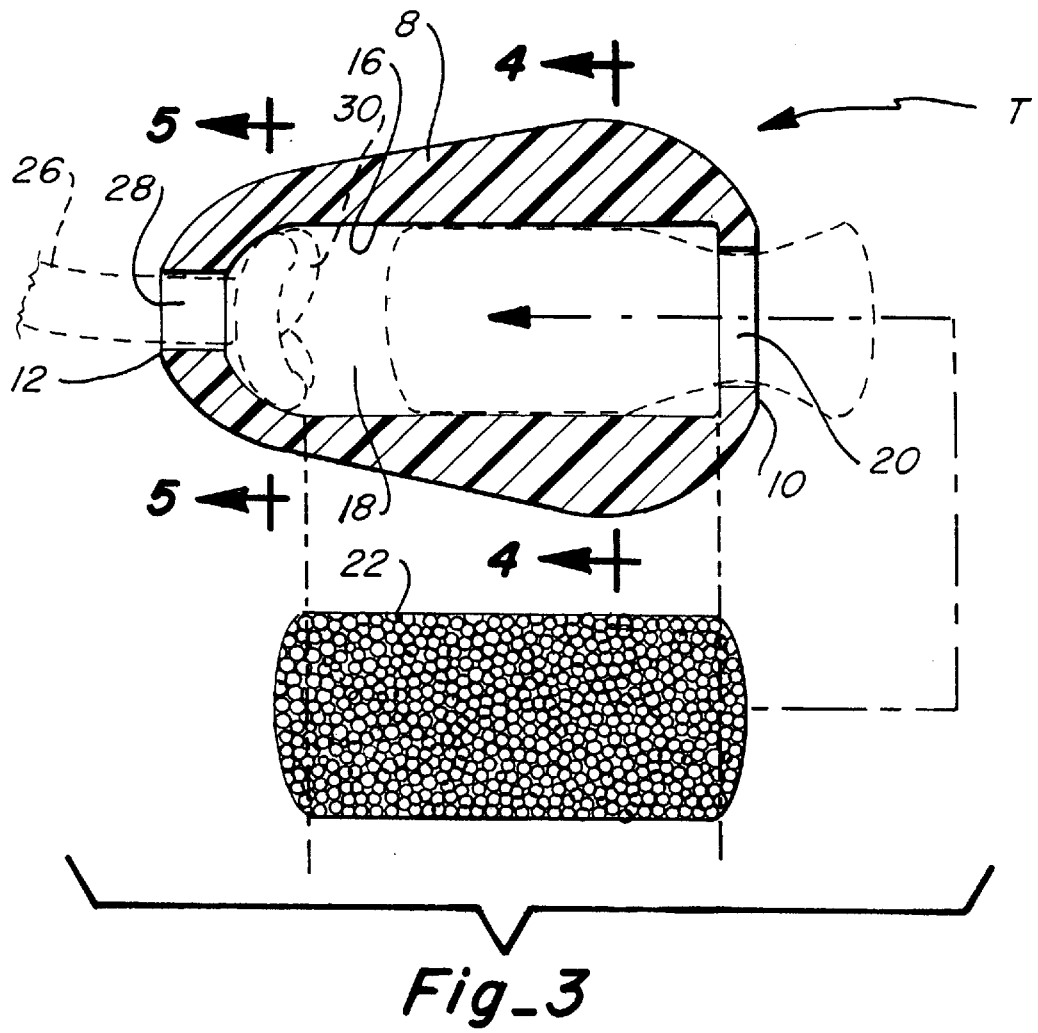
Fig_3
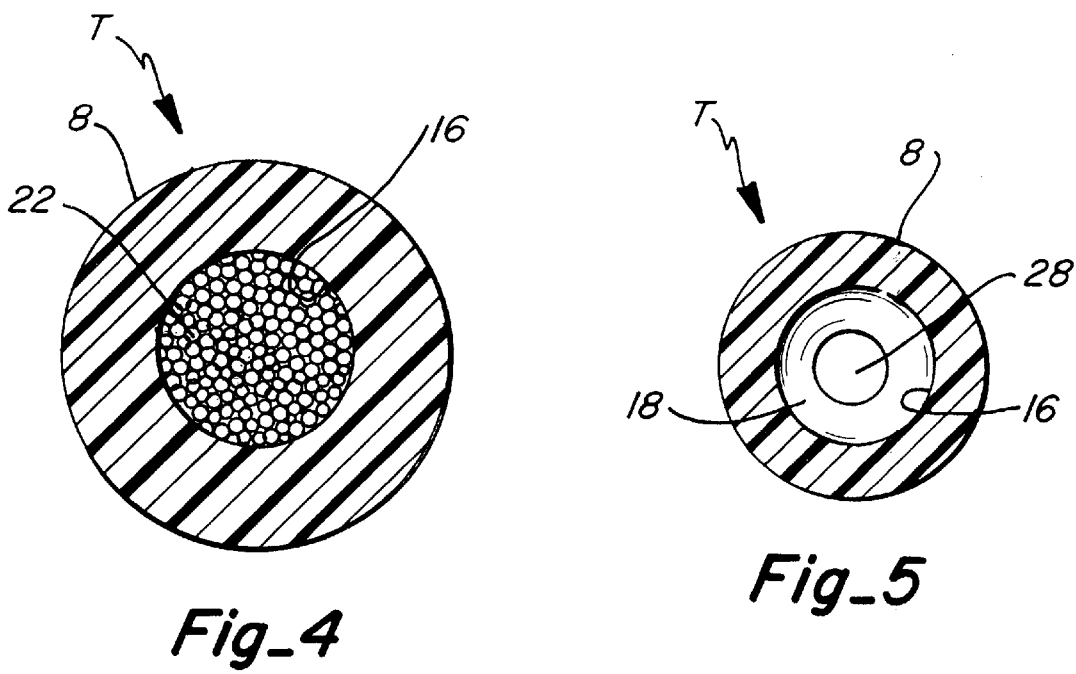
Fig_4
Fig_5

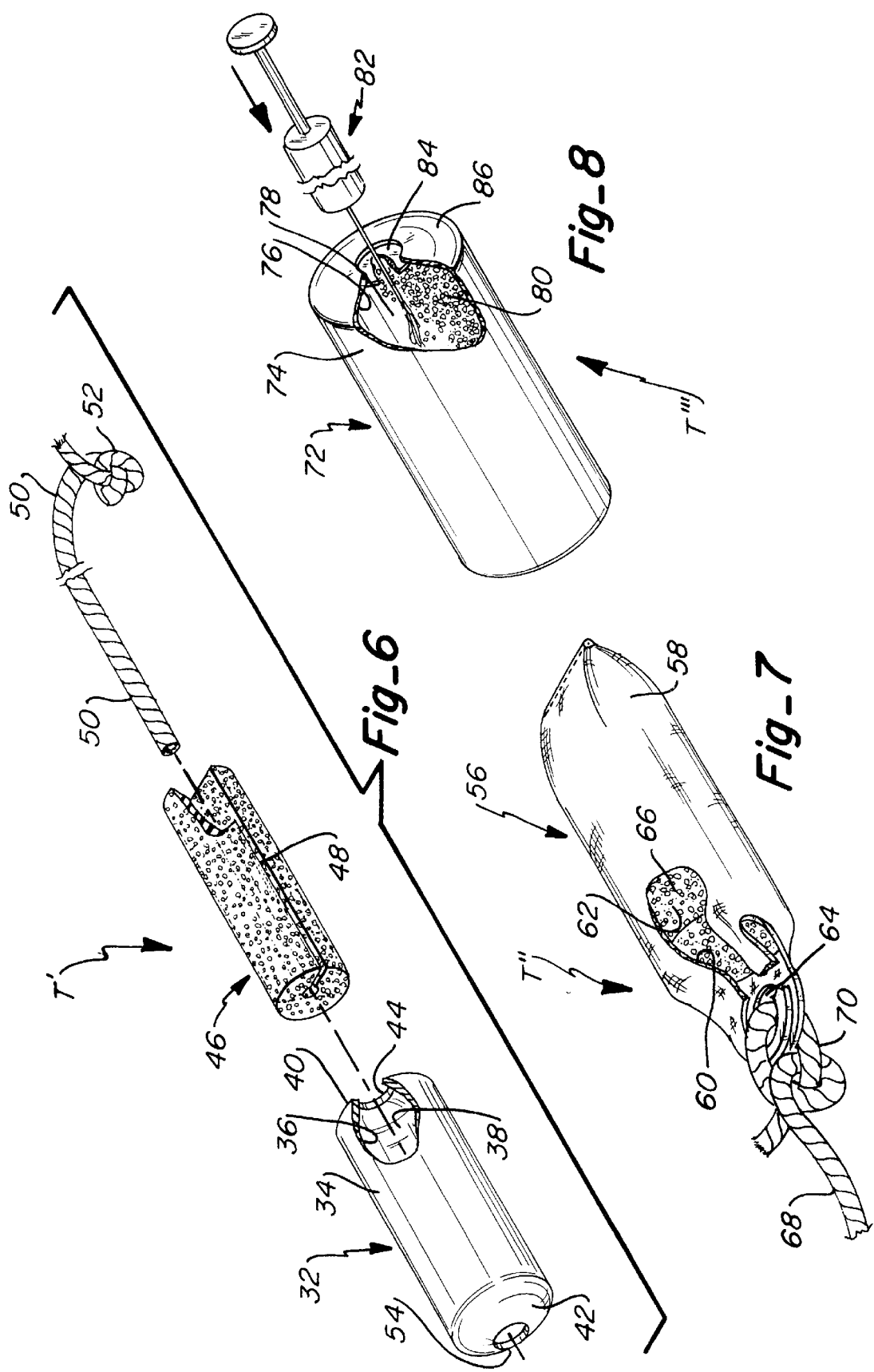

ANIMAL TOY WITH FLOATATION DEVICE

TECHNICAL FIELD

This invention relates to a pet toy, and more specifically a pet toy that floats high in the water. This increased buoyancy allows for better visibility when animals play with the pet toy in water.

BACKGROUND ART

Floatable pet toys are desirable for pets, such as some dogs, who enjoy playing and swimming in water. They are also desirable for training of dogs to retrieve birds which have been shot over open water. However, if a pet toy is made sufficiently buoyant for this purpose, it lacks the structural integrity needed to keep it from being quickly destroyed by a dog gripping it in its teeth during retrieval.

Smith U.S. Pat. No. 4,133,296 discloses a tubular canvas pet toy that is closed on both ends and filled with weighted parts, such as tennis balls. The weighted parts have the ability to move within the tube and will tend to move away from where the animal is holding the toy.

Garrison U.S. Pat. No. 3,830,202 discloses a cylindrical body which may be made of hardwood and has a central bore through which a cord extends the length of the body. The cord extends beyond the body on both ends and has mobility through the central bore. The cord acts as a pull toy and offers resistance when the animal tries to pull it to one end.

Edwards U.S. Pat. No. 4,557,219 discloses a polyurethane toy shaped as a bone. The polyurethane may be impregnated with air bubbles to make the toy lighter than water to allow the toy to float. The air bubbles weaken the polyurethane and the toy is more easily destroyed by chewing.

The present invention is an improvement on applicant's Cool Kong™ pet toy which floats in water. The Cool Kong™ consists of a hollow body with an opening in one end, and a diaphragm or plug that covers the opening trapping air within the body. The body is made from an elastomeric material that provides some buoyancy and the trapped air provides additional buoyancy. Although the Cool Kong™ satisfies the purposes for which it was designed, it does not provide the degree of buoyancy and durability of the present invention.

DISCLOSURE OF THE INVENTION

This invention relates to a floatable pet toy including a body made of relatively dense elastomeric material, having an outer surface and an inner surface forming a cavity. A buoyant material is placed inside the cavity which causes the pet toy to float high in the water and provides increased durability due to resistance to deformation of the body. A "buoyant material" as used herein includes any material having a specific gravity of less than 1.0. An example of such material is a flexible closed cell foam. Other examples include single or multiple cell bladders filled with a gas or light weight packing material such as packing "peanuts."

In one embodiment, the cavity is filled with a buoyant material, such as a closed cell foam thereby increasing both the buoyancy and resistance to deformation of the body of the pet toy. The buoyant material may be any shape, including a cylindrical shape, and is moderately flexible and resilient. The buoyant material is inserted through the opening in a first end and substantially fills the cavity thereby increasing the resiliency of the pet toy. The resiliency of the buoyant material makes the body of the toy less deformable and therefore more resistant to puncture or damage from chewing. A length of rope may be attached to the body at a second end which allows the pet toy to be tossed more easily and allows the pet toy to be used as a tug toy with the pet owner.

In a second embodiment, the body shape is elongated. The body is made from an elastomeric material with an outer surface, and an inner surface forming a cavity. The body's buoyancy and resistance to deformation are enhanced by an insert made of a buoyant material, such as a closed cell foam, that substantially fills the cavity. The insert is longitudinally slotted for insertion of rope. The rope is threaded through the center of the insert and knotted at the first end of the insert. The other end of the rope extends through an opening in the second end of the body. This embodiment is used as a training device to teach animals how to retrieve objects, such as birds, from a body of water. The rope runs the length of the insert to allow the toy to be thrown greater distances with increased durability for extensive training regimes.

In a third embodiment of the invention, the body is made from a flexible material such as canvas or plastic sheeting. The cavity is filled with a buoyant material, such as a closed cell foam, which also resists the deformation of the body when the toy is chewed. A rope may be attached to the body.

In a fourth embodiment, a buoyant material, such as a closed cell foam, is injected into a sealed hollow elastomeric body to improve the buoyancy and resistance to deformation of the body.

BRIEF DESCRIPTION OF THE DRAWINGS

FIG. 1 is a perspective view of an animal, such as a dog, playing with the present invention in the water;

FIG. 2 is a perspective view of the pet toy shown in FIG. 1;

FIG. 3 is a longitudinal section, taken along line 3—3 of FIG. 2, showing closed cell foam filling the cavity of the body and showing an exploded view of the insert;

FIG. 4 is a horizontal section, taken along line 4—4, showing interior cross section of the toy and cavity filled with closed cell foam;

FIG. 5 is a horizontal section, taken along line 5—5, showing interior cross section of the toy and opening where rope is inserted;

FIG. 6 is an exploded view of a second embodiment with parts broken away for clarity of illustration;

FIG. 7 is a perspective view of a third embodiment with parts broken away for clarity of illustration; and FIG. 8 is a perspective view of a fourth embodiment of this invention showing injection of the buoyant substance.

BEST MODE FOR CARRYING OUT THE INVENTIONS

In accordance with the present invention, an animal, such as a dog D, is shown in FIG. 1 playing with the first embodiment shown as the pet toy T, in the water. Water has a specific gravity of 1.00. Thus to float, the elastomeric material or other component of the pet toy T must have a specific gravity of less than 1.00. The lower the specific gravity of the elastomeric material, the higher the pet toy floats in water. However, when the specific gravity is less than 0.96, the elastomeric material is significantly less durable when it is chewed by the animal. In the present invention, the addition of a buoyant material, such as a closed cell foam, increases the resistance to deformation of a body with a specific gravity of less than 0.96. This enhanced resistance to deformation increases the durability of the pet toy when chewed by the animal despite the relatively low specific gravity value. Moreover, a buoyant material, such as a closed cell foam, will add buoyancy and durability to an elastomeric pet toy with a specific gravity of greater than 0.96.

As best seen in FIGS. 2 and 3, the pet toy T, has a hollow deformable body 8, which forms a side wall with first end 10 and second end 12. The body 8 has an outer surface 14, and an inner surface 16 which forms a cavity 18. The first end 10 has an opening 20 through which a buoyant resilient material may be inserted into the cavity 18. This buoyant material may be a closed cell foam 22 which provides increased buoyancy and resistance to deformation of the side wall of body 8. The closed cell foam 22 is flexible for durability when animal D plays with pet toy T and is shaped to substantially fill cavity 18 for increased durability of pet toy T by resisting deformation of the side wall of body 8 when an animal chews on it. A rope 26 is inserted through an opening 28 in the second end 12. The rope 26 is fastened by a knot 30 inside the body 8.

The second embodiment is shown in FIG. 6. The pet toy T', includes a deformable body 32 having a side wall with an outer surface 34, and an inner surface 36 forming a cavity 38. The body 32 is an elongated shape that has a first end 40 and a second end 42. The first end has an opening 44. The cavity 38 is substantially filled by a buoyant material, such as a closed cell foam insert 46. The closed cell foam insert 46 has a longitudinal slot 48 for insertion of rope 50. The rope 50 runs longitudinally through the center of the closed cell foam insert 46 and is fastened at the first end 40 by a knot 52. The rope 50 extends through a second opening 54 in the second end 42 of the body 32.

The third embodiment is shown in FIG. 7. The pet toy T" includes a body 56 made from a flexible material, such as canvas or plastic, with a side wall having an outer surface 58, and an inner surface 60 forming a cavity 62. The cavity 62 is filled with a closed cell foam 66 which provides improved durability of the body 56. A rope 68 is attached to body 56 through an opening 64, such as an eyelet, in the body 56. The rope 68 is fastened by a knot 70 inside of the body 56.

The fourth embodiment is shown in FIG. 8. The pet toy T'" includes a body 72 with a side wall having an outer surface 74, and an inner surface 76 forming a cavity 78. A buoyant material, such as a closed cell foam 80, is injected by a suitable injection device, such as a hypodermic needle 82, into the body 72. The buoyant material may be injected through a membrane 84 that seals the body 72 or directly through the end wall 86 if the end wall 86 is sufficiently thin.

The advantages of the pet toy are readily apparent. The buoyant material provides both additional buoyancy and resistance to deformation to the body of the pet toy. The pet toy floats high in the water which increases its visibility. Moreover, the added resistance to deformation of the closed cell foam provides increased durability of the body for long lasting use of the pet toy.

Although this invention has been described with respect to use with dogs, it is understood that it can be used with other animals such as land and sea animals, fish and reptiles.

This invention has been described in detail with reference to particular embodiments thereof, but it will be understood that various other modifications can be effected within the spirit and scope of this invention.

What is claimed is:

1. A floatable pet toy for animals to play with in water, said pet toy comprising:

a hollow deformable body having an outer surface, an inner surface forming a cavity, a first open end and a second end; and a buoyant material in said cavity which resists deformation of said deformable body.

2. A floatable pet toy, as claimed in claim 1, wherein: said hollow deformable body is an elastomeric material.

3. A floatable pet toy, as claimed in claim 1, wherein: said hollow deformable body is a flexible material.

4. A floatable pet toy, as claimed in claim 1, wherein: said buoyant material is a closed cell foam.

5. A floatable pet toy, as claimed in claim 4, wherein: said closed cell foam is shaped to substantially conform to the shape of said cavity, and said closed cell foam substantially fills said cavity.

6. A floatable pet toy, as claimed in claim 1, further including:

a length of rope fastened to said second end.

7. A floatable pet toy, as claimed in claim 1, wherein: said hollow deformable body is elongated and made from elastomeric material, and said buoyant material is an elongated closed cell foam insert that substantially fills said cavity, and has first and second ends.

8. A floatable pet toy for animals to play with in water, said pet toy comprising:

an elongated hollow deformable body having an outer surface, an inner surface forming a cavity, a first open end and a second end and an opening formed in said second end;

an elongated buoyant material in said cavity which is a closed cell foam insert that substantially fills said cavity, has first and second ends, and resists deformation of said hollow deformable body, and has a longitudinal slot extending from said first end to said second end;

a length of rope in said longitudinal slot extending the length of and beyond said first and second ends of said elongated closed cell foam; and a knot in said length of rope beyond said first end of said elongated closed cell foam insert, said rope extending through said opening in said second end of said elongated hollow deformable body.

9. A floatable pet toy for animals to play with in water, said pet toy comprising:

a hollow deformable buoyant body having an outer surface, an inner surface forming a cavity, a first open end and a second end;

means within said cavity for resisting deformation of said hollow deformable buoyant body.

10. A pet toy, as claimed in claim 9, wherein: said resisting means is a closed cell foam for providing additional buoyancy.

11. A pet toy, as claimed in claim 10, wherein: said closed cell foam is shaped to substantially fill said cavity.

12. A pet toy, as claimed in claim 9, further including: means in said second end of said deformable buoyant body for fastening a length of rope.

13. A method for constructing a floatable pet toy with increased buoyancy and durability, said method comprising the steps of:

providing a hollow deformable body with an outer surface, and an inner surface forming a cavity; and filling the cavity with a material that resists deformation.

14. A method, as claimed in claim 13, wherein:

the material is a closed cell foam adding buoyancy to said floatable toy.

15. A method, as claimed in claim 14, wherein:

the closed cell foam is inserted into the cavity through an opening in the hollow deformable body.

16. A method, as claimed in claim 13, wherein:

the cavity is sealed, and the closed cell foam is injected by a hypodermic needle into the cavity.

17. A floatable pet toy for animals to play with in water, said pet toy comprising:

a hollow deformable body having an a side wall with outer surface, an inner surface forming a cavity, a first open end and a second end; and a buoyant material in said cavity which resists deformation of said side wall.

18. A floatable pet toy, as claimed in claim 17, wherein:

said hollow deformable body is an elastomeric material.

19. A floatable pet toy, as claimed in claim 17, wherein:

said hollow deformable body is a flexible material.

20. A floatable pet toy, as claimed in claim 17, wherein:

said buoyant material is a closed cell foam shaped to substantially conform to the shape of said cavity, and said closed cell foam substantially fills said cavity.

* * * * *